(12) United States Patent
Narayanaswamy

(10) Patent No.: US 9,258,329 B2
(45) Date of Patent: *Feb. 9, 2016

(54) DYNAMIC ACCESS CONTROL POLICY WITH PORT RESTRICTIONS FOR A NETWORK SECURITY APPLIANCE

(71) Applicant: Juniper Networks, Inc., Sunnyvale, CA (US)

(72) Inventor: Krishna Narayanaswamy, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 292 days.

This patent is subject to a terminal disclaimer.

(21) Appl. No.: 14/065,097

(22) Filed: Oct. 28, 2013

(65) Prior Publication Data

US 2014/0053239 A1 Feb. 20, 2014

Related U.S. Application Data

(63) Continuation of application No. 12/261,512, filed on Oct. 30, 2008, now Pat. No. 8,572,717.

(60) Provisional application No. 61/104,132, filed on Oct. 9, 2008.

(51) Int. Cl.
*H04L 29/06* (2006.01)

(52) U.S. Cl.
CPC ............ *H04L 63/20* (2013.01); *H04L 63/0245* (2013.01); *H04L 63/0254* (2013.01); *H04L 63/0263* (2013.01)

(58) Field of Classification Search
CPC ............ H04L 63/0245; H04L 63/0254; H04L 63/0263; H04L 63/20
USPC ...................................... 726/1, 2, 3, 4, 5, 6, 7
See application file for complete search history.

(56) References Cited

U.S. PATENT DOCUMENTS 5,598,535 A   1/1997   Brech et al.
5,884,025 A   3/1999   Baehr et al.
(Continued)

FOREIGN PATENT DOCUMENTS

CN   101056306 A   10/2007
CN   101119321 A   2/2008
EP   1049294 A3   11/2000

OTHER PUBLICATIONS

Notice of Reexamination, and translation thereof, from Counterpart Chinese Patent Application No. 2009101640199, dated Dec. 17, 2014, 19 pp.

(Continued)

*Primary Examiner* — Brandon Hoffman
*Assistant Examiner* — Nega Woldemariam
(74) *Attorney, Agent, or Firm* — Shumaker & Sieffert, P.A.

(57) ABSTRACT

A network security appliance supports definition of a security policy to control access to a network. The security policy is defined by match criteria including a layer seven network application, a static port list of layer four ports for a transport-layer protocol, and actions to be applied to packet flows that match the match criteria. A rules engine dynamically identifies a type of layer seven network application associated with the received packet flow based on inspection of application-layer data within payloads of packets of the packet flow without basing the identification solely on a layer four port specified by headers within the packets. The rules engine is configured to apply the security policy to determine whether the packet flow matches the static port lists specified by the match criteria. The network security appliance applies the actions specified by the security policy to the packet flow.

20 Claims, 4 Drawing Sheets

(56) References Cited

U.S. PATENT DOCUMENTS

| | | |
|---|---|---|
| 5,960,452 A | 9/1999 | Chi |
| 6,147,976 A | 11/2000 | Shand et al. |
| 6,438,723 B1 | 8/2002 | Kalliojarvi |
| 6,697,381 B1 | 2/2004 | Talbot et al. |
| 6,826,694 B1 | 11/2004 | Dutta et al. |
| 6,854,063 B1 | 2/2005 | Qu et al. |
| 6,940,863 B2 | 9/2005 | Xue et al. |
| 6,963,564 B1 | 11/2005 | Liu |
| 6,973,055 B1 | 12/2005 | Du |
| 7,272,646 B2 | 9/2007 | Cooper et al. |
| 7,337,214 B2 | 2/2008 | Douglass et al. |
| 7,383,438 B2 | 6/2008 | Fahrny et al. |
| 7,454,792 B2 | 11/2008 | Cantrell et al. |
| 7,463,590 B2 | 12/2008 | Mualem et al. |
| 7,467,202 B2 | 12/2008 | Savchuk |
| 7,496,962 B2 | 2/2009 | Roelker et al. |
| 7,624,444 B2 | 11/2009 | Gupta et al. |
| 7,725,558 B2 | 5/2010 | Dickenson |
| 7,747,874 B2 | 6/2010 | Goodwill et al. |
| 7,830,864 B2 | 11/2010 | Li |
| 7,844,700 B2 | 11/2010 | Marinescu et al. |
| 7,890,612 B2 | 2/2011 | Todd et al. |
| 7,945,948 B2 | 5/2011 | Ueda et al. |
| 7,950,059 B2 | 5/2011 | Aharon et al. |
| 7,995,584 B2 | 8/2011 | Eswaran et al. |
| 8,042,182 B2 | 10/2011 | Milani Comparetti et al. |
| 8,112,800 B1 | 2/2012 | Yang et al. |
| 8,166,554 B2 | 4/2012 | John |
| 8,209,756 B1 | 6/2012 | Guruswamy et al. |
| 8,228,926 B2 | 7/2012 | Miller et al. |
| 8,291,495 B1 | 10/2012 | Burns et al. |
| 8,397,284 B2 | 3/2013 | Kommareddy et al. |
| 8,443,442 B2 | 5/2013 | Wang et al. |
| 8,572,717 B2 | 10/2013 | Narayanaswamy |
| 2002/0103953 A1 | 8/2002 | Das et al. |
| 2002/0144156 A1 | 10/2002 | Copeland, III |
| 2003/0088788 A1* | 5/2003 | Yang ............... H04L 63/0227 726/4 |
| 2003/0105976 A1 | 6/2003 | Copeland, III |
| 2003/0140140 A1 | 7/2003 | Lahtinen |
| 2003/0149888 A1 | 8/2003 | Yadav |
| 2003/0154399 A1 | 8/2003 | Zuk et al. |
| 2004/0151206 A1 | 8/2004 | Scholte |
| 2004/0205360 A1 | 10/2004 | Norton et al. |
| 2004/0268149 A1 | 12/2004 | Aaron |
| 2005/0055399 A1 | 3/2005 | Savchuk |
| 2005/0243789 A1 | 11/2005 | Dinello et al. |
| 2005/0262560 A1 | 11/2005 | Gassoway |
| 2006/0059551 A1* | 3/2006 | Borella ............ H04L 63/0227 726/13 |
| 2006/0101511 A1 | 5/2006 | Faillenot et al. |
| 2006/0114832 A1 | 6/2006 | Hamilton et al. |
| 2006/0123479 A1 | 6/2006 | Kumar et al. |
| 2006/0167915 A1 | 7/2006 | Furlong et al. |
| 2006/0168273 A1 | 7/2006 | Michael |
| 2006/0174337 A1* | 8/2006 | Bernoth ............ H04L 63/0263 726/11 |
| 2006/0259950 A1 | 11/2006 | Mattsson |
| 2006/0268932 A1 | 11/2006 | Singh et al. |
| 2006/0288418 A1 | 12/2006 | Yang et al. |
| 2007/0005801 A1 | 1/2007 | Kumar et al. |
| 2007/0067445 A1 | 3/2007 | Vugenfirer et al. |
| 2007/0171827 A1 | 7/2007 | Scott et al. |
| 2007/0192847 A1* | 8/2007 | Yeom ............... H04L 63/0227 726/12 |
| 2007/0192863 A1 | 8/2007 | Kapoor et al. |
| 2007/0230445 A1 | 10/2007 | Barrie et al. |
| 2008/0133518 A1* | 6/2008 | Kapoor ............... G06F 9/505 |
| 2008/0172731 A1* | 7/2008 | Aaron ............... H04L 63/0209 726/13 |
| 2008/0229415 A1* | 9/2008 | Kapoor ............... G06F 21/55 726/22 |
| 2009/0141729 A1 | 6/2009 | Fan |
| 2010/0085975 A1 | 4/2010 | Wang et al. |

OTHER PUBLICATIONS

Examination Report from counterpart European Application No. 09161760.5-1870, dated Jul. 30, 2014, 3 pp.

Dreger et al., "Dynamic application-layer protocol analysis for network intrusion detection," Proceeding of the Usenix Security Symposium, Jul. 31, 2006, pp. 257-272.

Andrew Moore, "Internet traffic Classification using Bayesian analysis techniques," Jun. 2005, ACM DL, vol. 33, Issue 1, pp. 53-60.

U.S. Appl. No. 12/409,634, filed Mar. 24, 2009, entitled "Applying Finegrain Policy Action Encapsulated Network Attacks," Yang.

U.S. Appl. No. 13/367,183, filed Feb. 6, 2012, entitled "Multilayered Application Classification and Decoding," Yang.

Prosecution History from U.S. Appl. No. 12/261,512, dated May 20, 2011 through Jun. 24, 2013, 88 pp.

Examination Report from European patent application No. 09161760.5, dated Jan. 22, 2013, 5pp.

Office Action from Chinese Application No. 200910164019.9, dated Apr. 18, 2012, 10 pp.

Communication from European Patent office for corresponding European Application No. 09161760.5, dated Jun. 16, 2011, 4 pp.

European Search Report from European application No. EP 09161760, dated Mar. 2, 2010, 7 pp.

Office Action from Chinese Application No. 200910164019.9, dated Nov. 20, 2012, 11 pp.

\* cited by examiner

DYNAMIC ACCESS CONTROL POLICY WITH PORT RESTRICTIONS FOR A NETWORK SECURITY APPLIANCE

This application is a continuation of U.S. application Ser. No. 12/261,512, filed Oct. 30, 2008, which claims the benefit of U.S. Provisional Application No. 61/104,132, filed Oct. 9, 2008, the entire content of each of which being incorporated herein by reference.

TECHNICAL FIELD

The invention relates to computer networks and, more particularly, to detection and prevention of attacks in computer networks.

BACKGROUND

A computer network typically includes a collection of interconnected computing devices that exchange data and share resources. The devices may include, for example, web servers, database servers, file servers, routers, printers, end-user computers and other devices. The variety of devices may execute a myriad of different services and communication protocols. Each of the different services and communication protocols exposes the network to different security vulnerabilities.

Due to increasing reliance on network-accessible computers, network security has become a major issue for organizations and individuals. To help ensure security of their computers, organizations and individuals may install security devices between public networks and their private networks. Such security devices may prevent unwanted or malicious information from the public network from affecting devices in the private network.

These security devices are commonly referred to as firewall device. Typically, the firewall is a dedicated device that is configured to control access to the private network by permitting or denying traffic flows based on an organization's security policies. Typical high-end firewalls provide packet forwarding by dynamically load-balancing packet flows to a set of service cards. These service cards provide flow-based security services, such as flow blocking, network address translation (NAT), anti-virus (AV) scanning and detection, intrusion detection prevention (IDP) and/or any other security services. The firewall device typically intercepts packets entering and leaving the private network, and processes the packets with the service cards and applies an administrator configured policy to determine whether to permit or deny the packet based on information included within each packet that may define a state of a flow associated with the packet.

SUMMARY

In general, techniques are described for providing flexible access control policies for network security. More specifically, improved techniques are described herein for a flexible and robust mechanism to define access control policies. A security appliance is described that may apply security policies defined by an administrator to control access to and from a network, such as a private enterprise computing network. As described herein, the techniques of the invention allow the security appliance to apply policies that specify actions to be applied to packet flows that match criteria including a network source, a network destination, a type of layer seven network application, and a static port list of one or more layer four ports for a transport-layer protocol. In some cases, the security appliance may additionally perform intrusion detection and prevention (IDP) and/or deep packet inspection (DPI) to detect and prevent network attacks on private enterprise computing network.

Conventionally, many firewalls and intrusion detection systems associate applications with a static layer four port assignment and use these static port assignments to statically define the type of application associated with a given data stream. However, many hackers or other malicious individuals utilize software applications that employ dynamic or randomized port assignments rather than conform to the static port assignments, in order to evade detection and containment. Such techniques render it difficult for firewalls and intrusion detection systems to correctly identify the type of layer seven application based only on static port assignments.

In response to these attempts to evade detection, some advanced firewalls and intrusion detection systems may dynamically determine the layer seven application associated with a given data stream (e.g., packet flow) based on signature or pattern matching operations. For example, regular expressions or sub-string matches may be applied to detect defined patterns within a data stream. However, even with the use of dynamic application identification, a malicious user may attempt to spoof (i.e., mimic) one type of application and instead use another in attempt to bypass a security appliance. As an example, a malicious user may attempt to circumvent a security appliance by spoofing an HTTP request when actually using a Peer-to-Peer protocol. Without applying an additional match criterion of a layer four port set, such a spoof may go undetected by the security appliance that is configured to allow HTTP application.

As described in further detail below, the techniques of the invention allow definition of a security policy that includes an additional match criterion of a layer four port list or port range to be applied even though the type of network application may be dynamically determined. In some examples, the policy may include a static list of allowed ports for a user and a network application, even though both the user and the network application are dynamically determined by the security appliance without the application identification being based solely on the layer four port of the packet flow. In other examples, the policy may include specific ports for which access by a given user with a given application are not allowed. As one example, such a policy may allow the security appliance to determine that the packet flow was just an attempt to bypass the security appliance, and the security appliance may take appropriate action, such as dropping future packets associated with the packet flow and/or alerting the targeted device of the attack. As another example, such a policy may allow the security appliance to prevent users within the enterprise network from wasting network resources with the use of peer-to-peer applications or other undesired applications.

In one embodiment, a network security appliance comprises an interface configured to receive a packet flow, and a control unit configured to support definition of a security policy to control access by the packet flow to a network, wherein the security policy specifies: (a) match criteria that include a layer seven network application and a static port list of one or more layer four ports for a transport-layer protocol, and (b) actions to be applied to packet flows that match the match criteria. The network security appliance also includes a rules engine configured to dynamically identify a type of layer seven network application associated with the received packet flow based on inspection of application-layer data within payloads of packets of the packet flow without basing the identification solely on a layer four port specified by headers within the packets. The rules engine is configured to apply the security policy, after the dynamic identification of the layer seven network application, to determine whether the packet flow matches the static port lists specified by the match criteria. Upon the rules engine determining that the packet flow matches the static port lists, the control unit applies the actions specified by the security policy to the packet flow.

In another embodiment, method for controlling access to a network with a network security appliance comprises receiving configuration information with a user interface of the network security appliance, wherein the configuration information specifies a security policy defined by: (a) match criteria that include a layer seven network application; and a static port list of one or more layer four ports for a transport-layer protocol, and (b) actions to be applied to packet flows that match the match criteria. The method also includes receiving a packet flow with an interface of the network security appliance, and, with a rules engine of the network security appliance, dynamically identifying a type of layer seven network application associated with the received packet flow based on inspection of application-layer data within payloads of packets of the packet flow without basing the identification solely on a layer four port specified by headers within the packets. The method further includes, with the rules engine, applying the security policy, after the dynamic identification of the layer seven network application, to determine whether the packet flow matches the static port lists specified by the match criteria, and upon the rules engine determining that the packet flow matches the static port lists, applying the actions specified by the security policy to the packet flow.

In another embodiment, a computer-readable medium contains instructions. The computer-readable medium may be a computer-readable storage medium. The instructions cause a programmable processor to receive configuration information with a user interface of a network security appliance that controls access to a network, wherein the configuration information specifies a security policy defined by: (a) match criteria that include a layer seven network application; and a static port list of one or more layer four ports for a transport-layer protocol, and (b) actions to be applied to packet flows that match the match criteria. The instructions also cause the programmable processor to, with a rules engine of the network security appliance, dynamically identify a type of layer seven network application associated with the received packet flow based on inspection of application-layer data within payloads of packets of the packet flow without basing the identification solely on a layer four port specified by headers within the packets. The instructions also cause the programmable processor to, with the rules engine, apply the security policy, after the dynamic identification of the layer seven network application, to determine whether the packet flow matches the static port lists specified by the match criteria, and upon the rules engine determining that the packet flow matches the static port lists, apply the actions specified by the security policy to the packet flow.

The techniques described herein may provide several advantages. For example, the techniques may allow a security appliance to provide improved firewall and/or intrusion detection and prevention services in environments where some applications no longer use a static port mapping but instead use dynamic or randomized port assignments in an attempt to evade detection and containment.

As another example, the techniques may help eliminate false positives and false negatives. A false positive may be the incorrect identification of a packet flow as malicious. A false negative may be failing to identify a malicious packet flow. The techniques may reduce or eliminate false positives and false negatives by requiring an allowed communication to not only match a particular source (e.g., a user or user role), destination, and dynamically identified application, but also by limiting the use of that application for the source and destination to a certain defined set or range of layer four ports.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
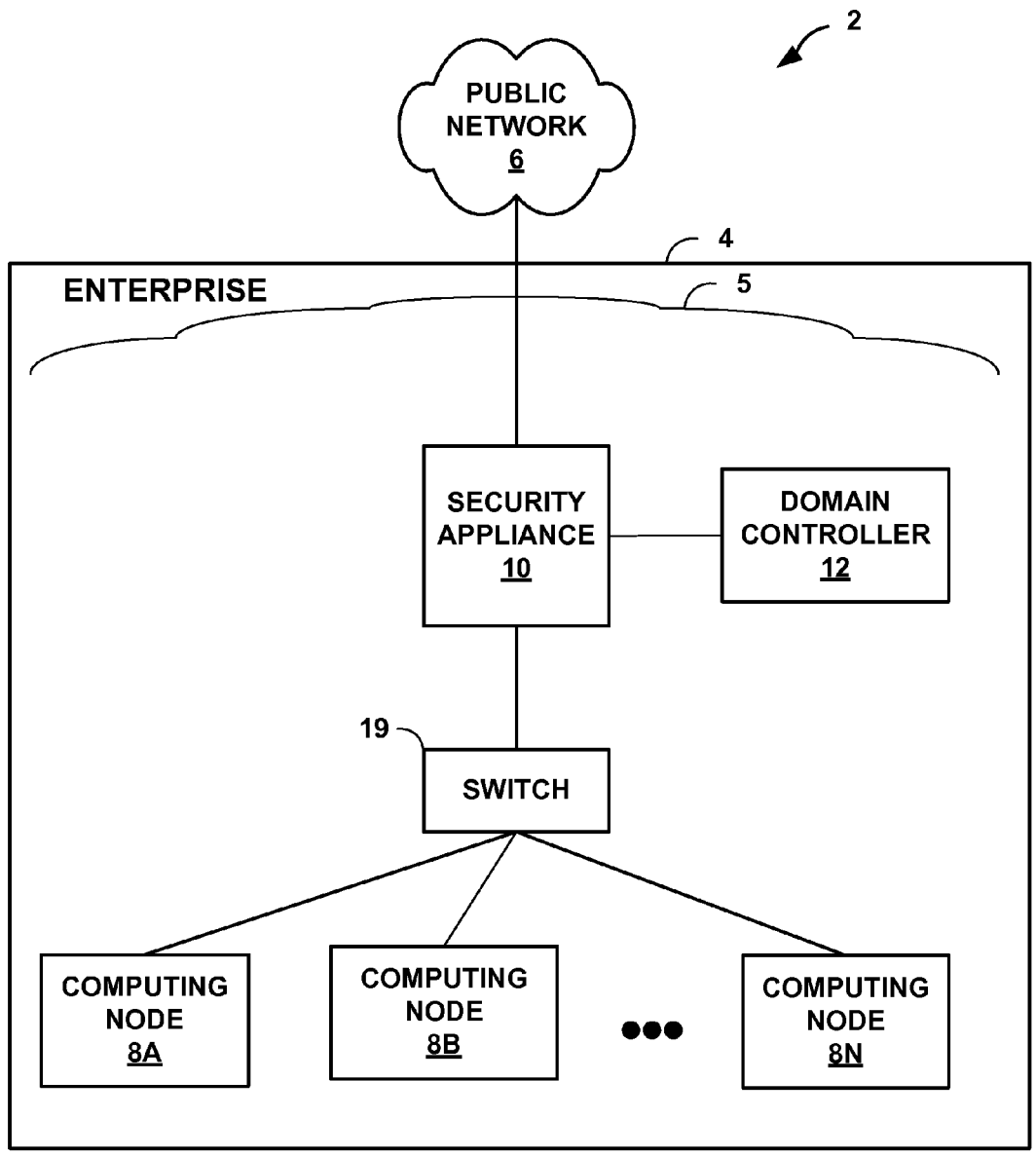
FIG. 1 is a block diagram illustrating an exemplary enterprise computer network in which a security appliance applies access control policies in accordance with the principles of the invention.

FIG. 1 is a block diagram illustrating an exemplary system 2 in which enterprise computer network 4 includes security appliance 10 that controls access to private enterprise computing network 5 in accordance with the principles of the invention. In the example embodiment of FIG. 1, security appliance 10 is a single network device. Network 4 includes a private enterprise computing network 5 that is coupled to public network 6, such as the Internet. Public network 6 may include, for example, one or more client computing devices (not shown). Security appliance 10 may include a firewall component to protect enterprise network 5 and, in particular, internal computing nodes 8A-8N. Computing nodes 8A-8N ("computing nodes 8") represent any private computing device within private enterprise computing network 5, including laptop computers, workstations, file servers, print servers, database servers, printers and other devices.

Security appliance 10 monitors traffic flowing between public network 6 and internal computing nodes 8. Security appliance 10 may apply security policies defined by an administrator to control access to private enterprise computing network 5, and to control communications allowed to be sent from computing nodes 8 to public network 6. As described herein, the techniques of the invention allow security appliance 10 to apply policies that specify actions to be applied to packet flows that match criteria including a source, a destination, a type of application, and a port set. In some cases, security appliance 10 may perform intrusion detection and prevention (IDP) and/or deep packet inspection (DPI) to detect and prevent network attacks on private enterprise computing network 5.

Conventionally, many firewalls and intrusion detection systems associate applications with a static port assignment and use these static port assignments to statically define the type of application and protocol associated with a given data stream. However, many hackers or other malicious individuals utilize software applications that employ dynamic or randomized port assignments rather than conform to the static layer four port assignments, in order to evade detection and containment. Additionally malicious individuals may also use well known ports to carry other malicious applications. Such techniques render it difficult for firewalls and intrusion detection systems to correctly identify the type of application and protocol based only on static port assignments.

In response to these attempts to evade detection, rather than use static port lists, some advanced firewalls and intrusion detection systems may dynamically determine the application and protocol associated with a given data stream based on signature or pattern matching operations. For example, regular expressions or sub-string matches may be applied to detect defined patterns within a data stream. However, even with the use of dynamic application identification, a malicious user may attempt to spoof (i.e., mimic) one type of application and instead use another in attempt to bypass a security appliance. As an example, a malicious user may attempt to circumvent a security appliance by spoofing an HTTP request when actually using a Peer-to-Peer protocol. Without applying an additional match criterion of a port set, as described herein, in conjunction with dynamic application identification and possibly dynamic user determination, such a spoof may go undetected by the security appliance.

As described in further detail below, the techniques of the invention allows a security appliance to apply policies that include an additional match criterion of a static layer four port list or port range, even though the security appliance first dynamically determines the layer seven (L7) application type (and optionally the network user) without regard to any static port restrictions. That is, the security appliance dynamically identifies a type of L7 application associated with a received packet flow based on inspection of application-layer data within payloads of packets of the packet flow without basing the identification solely on a layer four port specified by headers within the packets.

In some examples, the policy may include an allowed layer four port list, where layer four ports refer to port numbers found within a transport layer header of a packet, such as port 80 within a TCP header of a packet. In other examples, the policy may include specific ports for which access by a given user with a given L7 application are not allowed. As one example, such a policy may allow the security appliance to determine that the packet flow was an attempt to bypass the security appliance, and the security appliance may take appropriate action, such as dropping future packets associated with the packet flow and/or alerting the targeted device of the attack. As another example, such a policy may allow the security appliance to prevent users within enterprise network 5 from wasting network resources with the use of peer-to-peer applications or other undesired applications.

As a further example, the techniques described herein may allow servers to have well-known applications bound to non-standard layer four ports for administrator access. In addition, by restricting user access to a configured port list, the techniques described herein prevent a hacker from accessing a Trojan implanted on a server by spoofing a request to conform to the policy.

In operation, security appliance 10 identifies packet flows in the monitored traffic. As mentioned above, security appliance 10 analyzes the packet flows to identify characteristics of the packet flows, including dynamically identifying a type of application. Security appliance 10 also has knowledge of information about the source (e.g., a user name) and destination of the packet flow. Security appliance 10 compares the characteristics of the packet flows to stored policies to determine whether the characteristics match a set of match criteria of the stored policies. Specifically, a rules engine of security appliance 10 is configured to apply the security policy, after the dynamic identification of the layer seven network application, to determine whether the packet flow matches the static port lists specified by the match criteria. If a match is found, a corresponding action specified by the matching policy is applied to the packets of the packet flow. For example, the packets may be dropped, allowed, logged, etc.

In some aspects, the source component of the defined security policy may be specified in terms of a specific user. This takes into account the fact that a user may not be tied to a source single IP address. However, defining security policies in terms of individual users may not scale well for large networks having a high volume of users. An alternative for improved scalability may specify the source component in terms of a user's role in an enterprise network.

Further, in some aspects, based on the dynamically determined type of network application, security appliance 10 may transparently reassemble application-layer communications from payloads of the packet flows so as to detect network attacks, viruses and other malicious software carried by the packet flows. A set of protocol-specific decoders within security appliance 10 may analyze the application-layer communications and identify application-layer transactions. In general, a "transaction" refers to a bounded series of related application-layer communications between peer devices. For example, a single TCP connection can be used to send (receive) multiple HyperText Transfer Protocol (HTTP) requests (responses). As one example, a single web-page comprising multiple images and links to HTML pages may be fetched using a single TCP connection. An HTTP decoder identifies each request/response within the TCP connection as a different transaction. This may be useful to prevent certain attack definitions from being applied across transaction boundaries. In one embodiment, a transaction may be identified according to source and destination Internet Protocol (IP) address, protocol, and source and destination port numbers. Other embodiments may identify a transaction in other ways, for example, by using media access control ("MAC") addresses.

Security appliance 10 may use information obtained from a packet header, such as a source network address (e.g., an IP address), to send a query to domain controller 12 to obtain a corresponding user name associated with a user of a client device. Alternatively, security appliance may query a user access control (UAC) device or a lightweight directory access protocol (LDAP) server. In some cases, the policies stored by security device 10 may be written in terms of the user name or the user's roles. Here, security appliance 10 may use the login information to learn a role of the user in enterprise network 5. For example, a user's role may be defined with respect to a security clearance or access privileges, e.g., administrator, level five clearance, and the like. Alternatively, a user's role may be defined with respect to his or her function within an enterprise, such as finance, marketing, corporate research, upper-level manager, officer and the like. As another example, a user role might indicate the security posture of the endpoint device, e.g., whether the device is up-to-date with respect to security patches, whether the device has anti-virus (AV) software running, and the like. These roles could be used to control access to the network resources.

In some embodiments, a protocol decoder of security appliance 10 analyzes the application-layer communications and extracts protocol-specific elements. For example, for an FTP login transaction, the FTP decoder may extract a pattern corresponding to a user name, a name for the target device, a name for the client device and other information.

These techniques may allow security device 10 to provide improved firewall and/or intrusion detection and prevention services in environments where some applications no longer use a static port mapping but instead use dynamic or randomized port assignments in an attempt to evade detection and containment. For example, instant messaging programs may initiate communication on one port, but then agree to communicate thereafter on a distinct port (sometimes referred to as "port-hopping"). Other programs, such as peer-to-peer programs and hacker toolkits such as Metasploit, may determine ports dynamically as well. As described, security appliance 10 may include stored policies that permit or deny packet flows based not only on dynamically-identified applications without initial port restriction with respect to this determination, but then additionally statically defined port sets that permit or deny the particular application with respect to certain ports. In some embodiments, security appliance 10 may dynamically create a new policy that allows permitted applications to hop to a different port within the port list, possibly for a defined time period.

In some embodiments, enterprise network 5 may include multiple security appliances located within different regions (e.g., sub-networks) of enterprise network 5. Enterprise network 5 may include a central security management device that operates as a central device for managing the security appliances. Although the example illustrated in FIG. 1 is described in terms of being incorporated into a standalone security appliance 10 that performs firewall functionality and optionally intrusion detection, the functionality described herein may be incorporated within other devices, such as switch 19 or a router.

The example embodiment of security appliance 10 portrayed by FIG. 1 may provide several advantages. For example, security appliance 10 may reduce or eliminate false positives and false negatives. A false positive may be the incorrect identification of a packet flow as malicious. A false negative may be failing to identify a malicious packet flow. By including a match criterion of a port list in addition to application identification in which the determination is first made dynamically without restriction to certain ports, security appliance 10 helps eliminate false positives and false negatives by limiting the allowed communications for approved applications (once determined) to certain well-defined ports, or selectively blocking communications for the applications on certain ports.

Figure 2:
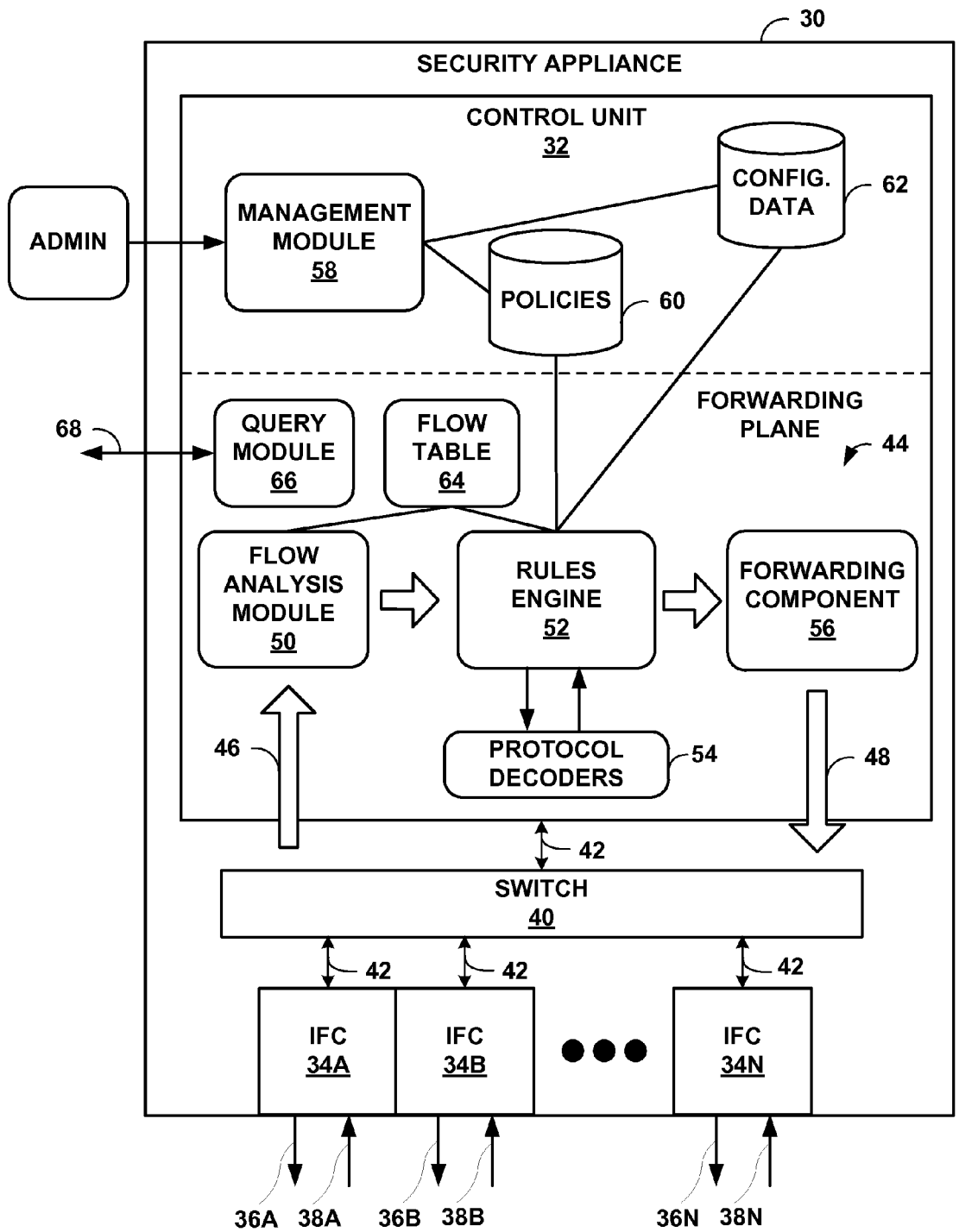
FIG. 2 is a block diagram illustrating an exemplary embodiment of a security appliance in further detail.

FIG. 2 is a block diagram illustrating an example security appliance 30 that protects a network by applying security services to received packet flows in accordance with the principles of the invention. Security appliance 30 may, for example, represent security appliance 10 of FIG. 1. Security appliance 30 controls access to the protected network by applying security policies to packet flows received by the security appliance 30. Security appliance 30 may also control access from the protected network to destinations outside of the network. For example, security appliance 30 may control what types of applications are permitted to be used on particular ports by particular users or user-roles associated with the protected network. The port set may consist of a single port, multiple ports, or one or more ranges of ports.

Security appliance 30 includes a control unit 32 that determines where to send received packets and forwards the packets accordingly. In the exemplary embodiment illustrated in FIG. 2, security appliance 30 includes interface cards (IFCs) 34A-34N (collectively, "IFCs 34") for communicating packets via outbound links 36A-36N ("outbound links 36") and inbound links 38A-38N ("inbound links 38"). IFCs 34 are interconnected by a high-speed switch 40 and links 42. In one example, switch 40 comprises switch fabric, switchgear, a configurable network switch or hub, and the like. Links 42 comprise any form of communication path, such as electrical paths within an integrated circuit, external data busses, optical links, network connections, wireless connections, or other type of communication path. IFCs 34 are coupled to outbound links 36 and inbound links 38 via a number of interface ports (not shown).

In the illustrated example, security appliance 30 includes a forwarding plane 44 that transparently monitors inbound network traffic 46 and forwards the network traffic as outbound network traffic 48. In the example illustrated by FIG. 2, forwarding plane 44 includes flow analysis module 50, rules engine 52, protocol decoders 54, forwarding component 56. Control unit 32 of security appliance 30 includes a management module 58. Management module 58 presents a user interface by which an administrator configures security appliance 30, e.g., by modifying policies 60 or configuration data 62 (CONFIG. DATA). Moreover, management module 58 may present a user interface by which an administrator may modify assumptions regarding packet flow characteristics, such as the highest priority packet flows for monitoring, port bindings for applications, or other features of determining a type of application and protocol associated with the packet flow. Management module 58 may present the user interface as a text-based command line interface, as a web browser-based interface, or other type of user interface.

The system administrator may configure security appliance 30 by interfacing with management module 58. The configuration information entered by the system administrator may be stored to configuration data 62. As another example, the system administrator may configure policies 60. Policies 60 include policies that specify match criteria and corresponding actions. According to the techniques of the invention, security appliance 10 supports a command syntax that allows an administrator or software agent to define a security policy that specifies that upon receiving packets matching particular criteria, control unit 32 should perform a particular action upon the packets, such as to allow, deny, drop, or log the packets. Rules engine 52 accesses policies 60 to determine whether received network traffic matches any of the policies 60. Policies 60 and configuration data 62 may be maintained in the form of one or more tables, databases, link lists, radix trees, databases, flat files, or any other data structures.

Policies may define the source and destination in various ways. For example, the destination is defined as one of a destination Internet Protocol (IP) address, a set of destination IP addresses, and an output zone that defines a set of output interfaces. Similarly, the source may be defined as one of a source IP address, a set of source IP addresses, and an input zone that defines a set of input interfaces. In other cases, the source may be defined as a specific user (e.g., by a username), or as a general user-role.

Security appliance 30 may, for example, provide a text-based command line interface by which a system administrator or software agent provides configuration data in conformance with a command syntax for configuring a policy as follows:

```
policy from-source to-destination {
    match {
        source <s>;
        destination <d>;
        application <app>;
        port <p>;
    }
    then {
```

```
          actions;
      }
  }
```

In the example syntax above, the keyword "policy" indicates that the administrator is defining a security policy to be applied by security appliance 30. The keyword "from-source" indicates that the subsequent text specifies a defined source from which traffic must be received for the policy to apply. The keyword "to-destination" indicates that the subsequent text specifies a defined destination to which the traffic must be destined for the policy to apply. As shown above, the policy includes a keyword "match" that allows the administrator to specify packet flow criteria, such as source (e.g., source network address), destination (e.g., destination network address), port (i.e., source port and/or destination port), application or other criteria. In addition, the policy specifies one or more actions to be applied to network traffic that is received via the "from-source" for output on the "to-destination" and that matches any packet flow criteria specified in the policy. Security appliance 30 then applies the actions enumerated in the policy to network traffic satisfying those conditions. Example actions including packet filtering, packet logging, intrusion detection and prevention, virus scanning, network address translation (NAT), policy-based authentication, and the like.

As another example, security appliance 30 may provide a text-based command line interface by which a system administrator or software agent provides configuration data in conformance with a command syntax for configuring a policy as follows:

```
          policy from-source to-destination {
              match {
                  user-role <u>;
                  destination <d>;
                  application <app>;
                  port <p>;
              }
              then {
                  actions;
              }
          }
```

The policy syntax shown above is similar to the first example, except that a "source" criterion is replaced by a "user-role" criterion. Thus, instead of specifying a policy in terms of a source network address, a policy may be specified in terms of a user-role.

In accordance with the example syntax, an administrator may provide configuration data as follows:

```
          policy from-Zone_Untrust to-Zone_Trust {
              match {
                  user-role <administrator>;
                  destination <www.juniper.net>;
                  application <HTTP>;
                  port <tcp/80, tcp/8000>;
              }
              then {
                  allow;
              }
          }
```

In contrast to conventional firewall policy syntax, which requires policies to be specified either according to static port-bindings or according to dynamically identified applications, management module 58 supports this improved syntax for defining policies that specify an application for dynamic identification, as well as a port set that must be matched. For example, in some cases, a network may include a plurality of servers in which it is known that a given set of applications will only be running on certain ports. The techniques described herein allow the administrator to limit the allowed application requests to those certain ports even though the security device is able to first dynamically determine the network application (e.g., HTTP) from a packet flow without restriction to a static mapping between application and port. This provides a more robust firewall policy. The syntax described herein allows the user to enjoy the advantages of the dynamic application identification approach to access control policies in an advanced firewall, while also having the flexibility to specify the additional criterion of a matching port set, which can close loopholes found in access control policies based only on dynamic application identification.

Security appliance 30 receives network traffic from public network 6 or one of nodes 8 on one of inbound links 38A of an IFC 34. Flow analysis module 50 receives the network traffic from switch 40 as inbound traffic 46 and identifies packet flows within the traffic. Each packet flow represents a flow of packets in one direction within the network traffic and is identified by at least a source address, a destination address, and a communication protocol. Flow analysis module 50 may utilize additional information to specify network flows, including source media access control ("MAC") address, destination MAC address, source port, and destination port. Other embodiments may use other information to identify network flows, such as IP addresses, VLAN tags, MPLS labels, or other information.

In some cases, flow analysis module 50 may, based on analysis of the packet flow, determine a username associated with the packet flow. Query module 66 may issue a query 68 to domain controller 12 (FIG. 1) with an IP address found in a header of packets in the packet flow to obtain a user name, user-role name, or other information associated with the IP address. Query module 66 may receive a response 69 from domain controller 12 that provides the user name, user-role, or other information associated with the IP address.

In general, rules engine 52 inspects the inbound traffic to dynamically identify a type of network application associated with each packet flow based on characteristics of the packet flow, such as by examining a signature of the payload of each packet. In this way the application identification is dynamic in that the determination is not based on a static port assignment for each type of application, but rather it is based on the content of the packet. In some cases, the application determination process may take into consideration any identifiable handshaking or timing characteristics in the bidirectional packet flows for a communication session that indicate or suggest the type of application. In some aspects, rules engine 52 may invoke the appropriate one of protocol decoders 54 based on the identified type of application determination to further analyze the application-layer communications. Protocol decoders 54 represent a set of one or more protocol-specific software modules. Each of protocol decoders 54 corresponds to a different communication protocol or service. Examples of communication protocols that may be supported by protocol decoders 54 include the HyperText Transfer Protocol ("HTTP"), the File Transfer Protocol ("FTP"), the Network News Transfer Protocol ("NNTP"), the Simple Mail Transfer Protocol ("SMTP"), Telnet, Domain Name System ("DNS"), Gopher, Finger, the Post Office Protocol ("POP"), the Secure Socket Layer ("SSL") protocol, the Lightweight Directory Access Protocol ("LDAP"), Secure Shell ("SSH"), Server Message Block ("SMB") and other protocols.

Protocol decoders 54 analyze reassembled application-layer communications and output transaction data that identifies application-layer transactions. In particular, the transaction data indicate when a series of related application-layer communications between two peer devices starts and ends. Rules engine 52 analyzes the reassembled data for the packet flow to identify the type of application and protocol associated with the packet flow. If rules engine 52 is unable to identify the type of application and protocol associated with the packet flow, rules engine 52 may in some embodiments use the well-known static port binding as a default application selection.

Flow analysis module 50 maintains data within flow table 64 that describes each active packet flow present within the network traffic. Flow table 64 specifies network elements associated with each active packet flow, i.e., information such as network addresses of source and destination devices, usernames, L7 application types, and ports associated with the packet flow. In addition, flow table 64 may identify pairs of packet flows that collectively form a single communication session between a client and server. For example, flow table 64 may designate communication session as pairs of packet flows in opposite directions for flows sharing at least some common network addresses, and layer four ports within transport layer protocol headers of packets.

Rules engine 52 accesses policies 60 to determine whether any stored policies match the identified source, destination, type of application, and layer four ports within transport layer protocol headers of packets of the packet flow. If a matching policy is found, rules engine 52 applies the corresponding action specified by the matching policy. Example actions may include allowing, denying, dropping, or logging the packets. If no matching policy is found, rules engine 52 may apply a default action to the packet flow (e.g., to allow or deny the packet flow).

In some embodiments, security appliance 30 may also perform deep packet inspection. For example, rules engine 52 may include a stateful inspection engine that inspects both client-to-server packet flows as well as server-to-client packet flows in order to more accurately identify the type of application and underlying protocol for each communication session. The stateful inspection engine may apply attack patterns to identify network attacks. Further details regarding operation of such a stateful inspection engine may be found in application Ser. No. 11/835,923, filed Aug. 8, 2007, entitled "Identifying Applications for Intrusion Detection Systems," the entire contents of which are incorporated by reference herein. This may assist when, for example, a malicious user attempts to spoof (i.e., mimic) one type of application and instead use another in attempt to bypass a security appliance. As an example, a malicious user may attempt to circumvent a security appliance by spoofing an HTTP request when actually using a Peer-to-Peer protocol. Security appliance 30 may determine from the response from the server that the original packet flow was just an attempt to bypass security appliance 30 and may take appropriate action, such as dropping future packets associated with the packet flow and/or alerting the targeted device of the attack.

The architecture of security appliance 30 illustrated in FIG. 2 is shown for exemplary purposes only. The invention is not limited to this architecture. In other embodiments, security appliance 30 may be configured in a variety of ways. In one embodiment, for example, some of the functionality of control unit 32 may be distributed within IFCs 34. In a further embodiment, control unit 32 may include a routing engine that performs routing functions and maintains a routing information base (RIB), e.g., routing information, and a forwarding engine that performs packet forwarding based on a forwarding information base (FIB), e.g., forwarding information, generated in accordance with the RIB. Moreover, although described with respect to security appliance 30, the forwarding techniques described herein may be applied to other types of network devices, such as gateways, switches, servers, workstations, or other network devices. Control unit 32 may be implemented solely in software, or hardware, or may be implemented as a combination of software, hardware, or firmware. For example, control unit 32 may include one or more processors which execute software instructions. In that case, the various software modules of control unit 32 may comprise executable instructions stored on a computer-readable storage medium, such as computer memory or hard disk.

Figure 3:
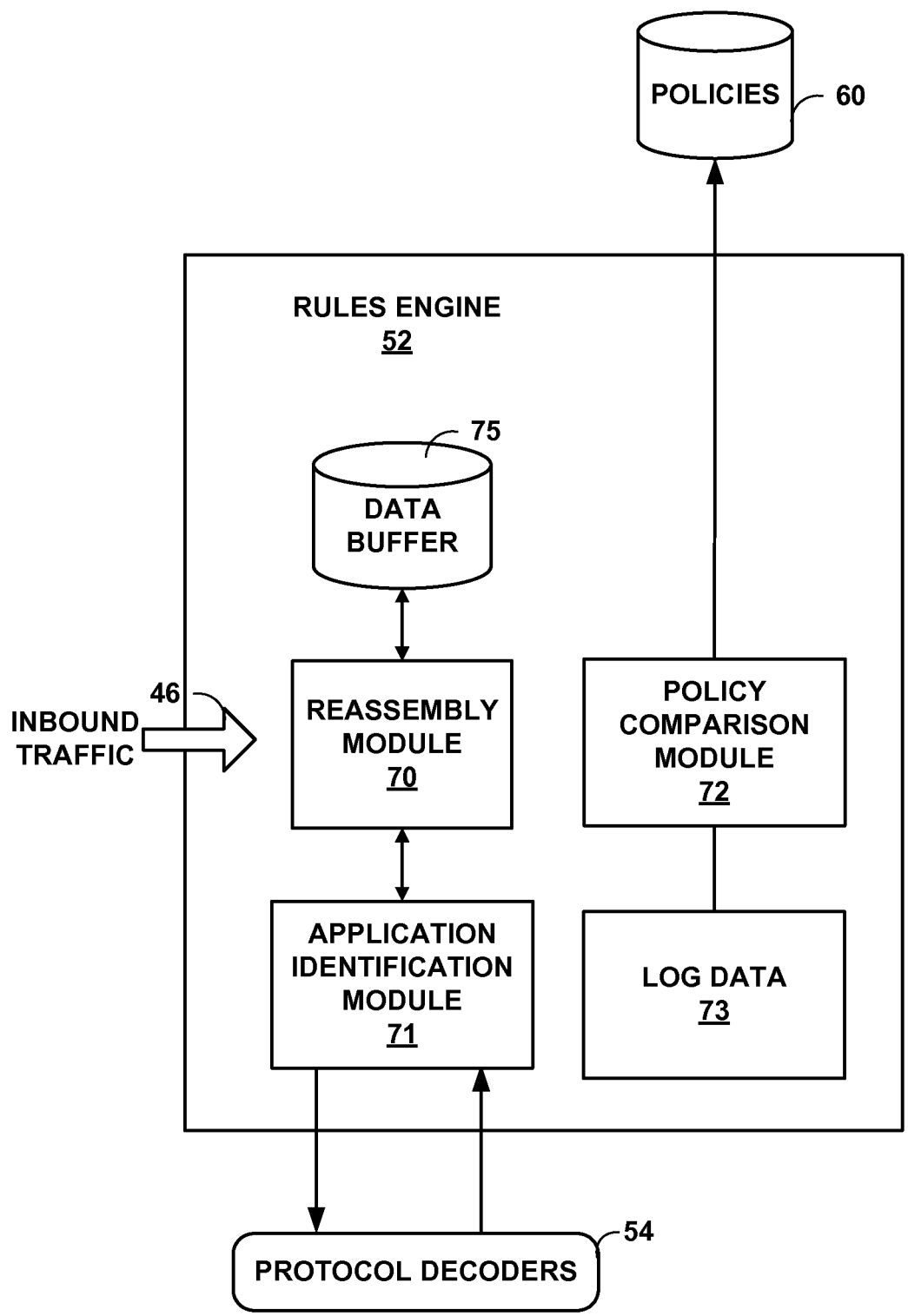
FIG. 3 is a block diagram that illustrates an example embodiment of a rules engine of the security appliance of FIG. 2 in further detail.

FIG. 3 is a block diagram that illustrates an example embodiment of rules engine 52 in further detail. In the example embodiment, rules engine 52 includes reassembly module 70, application identification module 71. In addition, rules engine 52 data buffer 75 and policy comparison module 72. Reassembly module 70 receives inbound network traffic 46 and reassembles application-layer communications from the packet flows. Reassembly module 70 forwards the reassembled application-layer communications to the appropriate protocol decoders 54 for processing.

Application identification module 71 identifies the type of application for each intercepted communication session, such as SQL query using HTTP. When rules engine 52 receives a packet as part of a packet flow, reassembly module 70 buffers the packet in data buffer 75. In one embodiment, data buffer 75 may store data as a sliding window. That is, data buffer 75 may store data until becoming full or reaching a specified required amount of minimum data for identification. When full, data buffer 75 discards certain data to make room for storing new data. In one embodiment, data buffer 75 may store and discard data according to a first-in, first-out ("FIFO")-like protocol wherein the first data to be stored is the first data to be discarded when data buffer 75 becomes full. In another embodiment, data buffer 75 may discard data according to a least recently used protocol wherein, when data buffer 75 is full, the packet flow which has been least recently used will be discarded to make room for new data to be stored.

In one embodiment, reassembly module 70 may associate packets in a packet flow, and packet flows as a communication session, according to the 5-tuple {source IP address, destination IP address, protocol, source port, destination port}. Other embodiments may use other forms of associating packets. For example, in one embodiment, security appliance 30 may be part of a network that utilizes virtual local area networks (VLANs). Accordingly, reassembly module 70 may associate packets in a packet flow according to a VLAN identifier, a source address, and a destination address. In any case, reassembly module 70 may utilize the information maintained within flow table 64 (FIG. 2) to reassemble network data, e.g., to form reassembled TCP data.

Application identification module 71 analyzes the reassembled data for the packet flow to identify the type of application associated with the packet flow. If application identification module 71 is unable to identify the type of application associated with the packet flow, application identification module 71 may use the well-known static port binding as a default application selection. Moreover, an administrator may configure the static port mapping using management module 58.

In the case where application identification module 71 is unable to identify a type of application for a packet flow, application identification module 71 may use the default static port mapping to determine an application, causing security appliance 30 to respond accordingly. In some cases, application identification module 71 may not be able to identify the application and the static port mapping may not have an entry for the requested port number. Various embodiments may treat this situation according to specifications of, for example, a system administrator. For example, in one embodiment, security appliance 30 simply forwards packet flows with undetermined application types that cannot be determined by the static port mapping, as an unknown application may indicate that the packet flow is not targeting any type of application known to pose a security threat. In other embodiments, security appliance 30 may automatically discard packet flows with unknown application types that cannot be determined by the static port mapping.

Application identification module 71 may include a hierarchically ordered list of similar application types. Application identification module 71 may store this list as a tree structure in a computer-readable medium. Security management module 44 may provide an administrator with a user interface to modify the contents and hierarchy of the list. Upon receiving a packet flow which may belong to one of several similar applications, application identification module 71 may make a preliminary best guess of the application by selecting the type of application designated as the highest ordered application in the list to which the packet flow corresponds. As application identification module 71 receives more information about the packet flow, application identification module 71 may alter the original determination accordingly. After determining an application, application identification module 71 may cache the determination for subsequent comparison.

As discussed above, flow analysis module 50 (FIG. 2) identifies the source (specifically, the user or user's role), destination, and port associated with the packet flow, such as based on packet headers. Flow analysis module 50 may provide this information to rules engine 52, which may cache this information for subsequent comparison. Policy comparison module 72 of rules engine 52 compares the identified characteristics of the packet flow, e.g., the user or user's role, destination, application type, and port, with policies 60. Policy comparison module 72 may use a variety of methods for performing the comparison. For example, policies 60 may be referenced using a hash implementation. As another example, policies 60 may be maintained as a trie data structure, in which policy comparison module 72 looks up a first characteristic, and is then directed to a given portion of the trie data structure based on the first characteristic, in which policy comparison module 72 then looks up the second characteristic, and so on. For example, policy comparison module 72 may first look up the user role characteristic of the packet flow, and then be directed to a subset of the trie data structure specific to that user role. Policy comparison module 72 may then look up the application type of the packet flow within the branch of the trie specific to the user role, and then be directed to a further subset of the data structure specific to that application type. Only certain ports may be specified for that user role and that application type. For example, a user role of "level five access" using HTTP may be allowed only on ports 80 or 8000.

Upon policy comparison module 72 finding a matching policy within policies 60, rules engine 52 applies a corresponding action to the packet flow as specified by the matching policy. Example actions include allowing, dropping, and/or logging the packets of the packet flow. If no matching policy is found, rules engine 52 may apply a default action to the packet flow (e.g., to allow or deny the packet flow).

In some embodiments, rules engine 52 may record certain information about packet flows that trigger a match to policies 60. For example, policy comparison module 72 may maintain log data 73. Log data 73 may record whether a matching packet flow was allowed or denied, the identity of the user that was allowed or denied, what application was being used by the packet flow, what port was being used by the packet flow, a timestamp, and other information. This information may be useful in creating future security policies. In some embodiments, rules engine 52 may dynamically update policies 60 to install a new policy "on the fly" based on a packet flow detected by security appliance 30.

Figure 4:
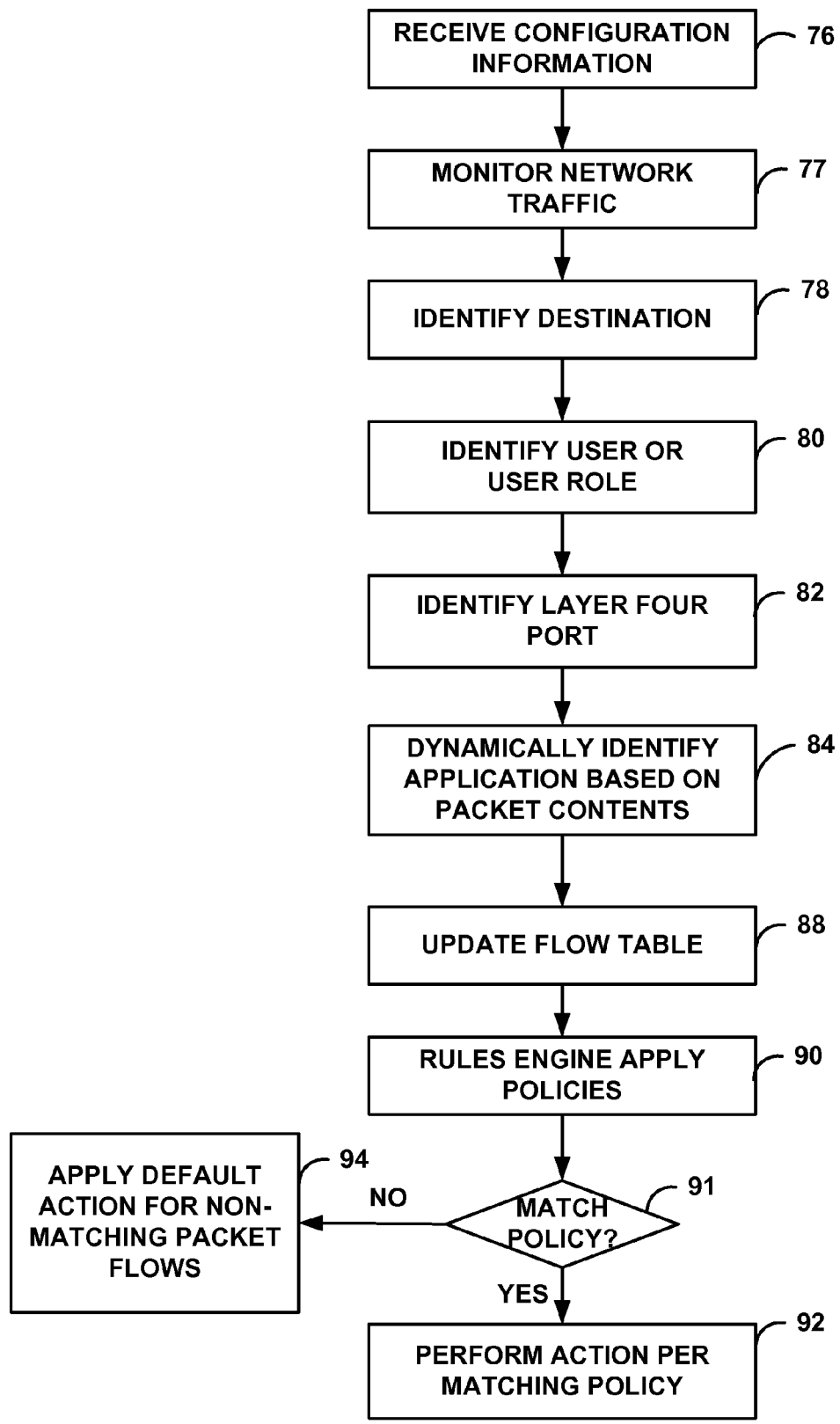
FIG. 4 is a flowchart illustrating exemplary operation of a security appliance in accordance with the principles of the invention.

FIG. 4 is a flowchart illustrating exemplary operation of a security appliance in accordance with the principles of the invention. For exemplary purposes, FIG. 4 is described in reference to security appliance 30 (FIG. 2). Initially, management module 58 receives configuration information from an administrator and, in response, configures security appliance 30 to monitor a network or portions thereof (e.g., subnets) of interest (76). During this process, management module 58 may present a user interface by which an administrator specifies security policies or other information. In accordance with the techniques of the invention, management module 58 supports a command syntax that allows the administrator or a software agent to specify security policies in terms of match criteria consisting of a source (e.g., user or user role), a destination, an application, and a port set.

Once configured, security appliance 30 monitors network traffic 46 (77). In some configurations, rules engine 52 of forwarding plane 44 may receive network traffic and mirror the network traffic for purposes of analysis. Forwarding component 56 seamlessly forwards the original network traffic. In other embodiments, traffic is not mirrored, but rather a line-rate buffering approach is used to analyze the traffic in real-time prior to forwarding.

Flow analysis module 50 analyzes the network traffic to identify packet flows and updates flow table 64 to describe each active flow present within the network traffic. For example, flow analysis module 50 identifies a destination network address associated with a packet flow, such as a destination IP address, based on a header of the packets in the packet flow (78). Flow analysis module 50 also identifies a source associated with the packet flow (80). For example, flow analysis module 50 may extract a source network address (e.g., source IP address) from packet headers of the packet flow, and may invoke query module 66 to issue a query to a domain controller, UAC, or LDAP server with the source IP address to obtain a user name, user role, or other information relating to the source of the packet flow. Flow analysis module 50 also identifies a layer four port within a transport layer protocol header within the packet, such as port 80 within a TCP header of the packet (82).

Rules engine 52 buffers the packets of each flow in data buffer 75, and reassembles the payloads of the packets within the packet flow into layer seven application-layer data (80). Rules engine 52 may wait until a sufficient, minimum amount of application-layer data is assembled from the payloads before proceeding to application identification. As packets may arrive out of order, reassembly module 70 may wait until enough data have arrived to determine the beginning of the packet flow before performing analysis on the application-layer data.

After identifying the beginning of the packet flow, application identification module 71 analyzes the application-layer data assembled from the payload of the packet to dynamically make a determination of the type of layer seven application that transmitted the packet flow, such as Skype, HyperText Transfer Protocol ("HTTP"), the File Transfer Protocol ("FTP"), the Network News Transfer Protocol ("NNTP"), the Simple Mail Transfer Protocol ("SMTP"), Telnet, Domain Name System ("DNS"), Gopher, Finger, the Post Office Protocol ("POP"), the Secure Socket Layer ("SSL") protocol, the Lightweight Directory Access Protocol ("LDAP"), Secure Shell ("SSH"), Server Message Block ("SMB"), and other layer seven applications (84). This determination may be based on a signature or profile computed from the bytes within the payload, a pattern of the received packet flow with respect to the amount of data received in each of the packets of the packet flow and the timing of each packet, or other characteristics.

In some aspects, application identification module 71 may use a static port binding list to select a default type of application when application identification module 71 is unable to identify the type of application within a defined degree of confidence. In some configurations, application identification module 71 may use a function pointer to assist in identifying the application when an initial pattern applied to the packet flow does not reveal enough detail to select a type of layer seven application That is, application identification module 71 may maintain a set of additional functions (i.e., software procedures) to inspect particular fields and perform certain functions on the data contained therein in order to identify the type of application. The function pointer may also perform an operation on one or more fields of payloads carried by the packet flow to produce an indicator of a network attack.

In some embodiments, application identification module 71 may invoke one or more of the functions by way of the predefined function pointers to provide a deeper level of analysis when determining the type of application and protocol for the communication session. Application identification module 71 may in some cases also invoke the appropriate protocol decoders 54 to further analyze the application-layer communications based on the application and protocol determination (i.e., deep packet inspection).

Flow analysis module 50 updates flow table 64 to reflect the identified characteristics of the packet flow (88), including the determined source, destination, layer seven application, protocol, and port. Rules engine 52 accesses policies 60 to determine whether the packet flow matches any of the stored policies 60 based on the identified characteristics (90). Specifically, after dynamically identifying the type of layer seven network application associated with the received packet flow based on inspection of application-layer data within payloads of packets of the packet flow, rules engine 52 applies the policies 60 to determine whether the packet flow matches the static port lists specified by the match criteria. If the packet flow matches one of the policies 60 (91) (i.e., matches one of the static port lists specified by match criteria of the policies 60), rules engine performs the appropriate action according to the matching policy (92). If the packet flow does not match any of the policies 60, rules engine 52 may apply a default action to the non-matching packet flow (94), such as to deny the packet flow or to allow the packet flow to be forwarded by forwarding component 56 as outbound network traffic 48.

Various embodiments of the invention have been described. These and other embodiments are within the scope of the following claims.

What is claimed is:

1. A network security device comprising:
an interface configured to receive a packet flow;
a control unit configured to receive a security policy to control access by the packet flow to a network, wherein the security policy includes:
(a) match criteria that include a static port list of one or more layer four ports for a transport-layer protocol and a type of layer seven application, and
(b) actions to be applied to packet flows that match the match criteria; and
a rules engine of the control unit configured to dynamically identify a type of layer seven application associated with the packet flow by inspecting application-layer data within payloads of packets of the packet flow and without basing the identification solely on a layer four port specified by headers within the packets,
wherein the rules engine is further configured to determine whether the dynamically identified type of layer seven application associated with the packet flow matches the type of layer seven application of the security policy,
wherein the rules engine is further configured to apply the security policy to determine whether the packet flow matches a layer four port in the static port list of the match criteria of the security policy, and
wherein the rules engine is further configured to, upon determining that the packet flow matches a layer four port of the static port list and upon determining the dynamically identified type of layer seven application associated with the packet flow matches the type of layer seven application of the security policy, applies the actions of the security policy to the packet flow.

2. The network security device of claim 1, wherein the rules engine is further configured to dynamically identify the type of layer seven application associated with the packet flow by performing deep packet inspection and signature-based application identification.

3. The network security device of claim 2, wherein the rules engine is further configured to dynamically identify the type of layer seven application using the layer four port specified by the headers within the packets to select a set of patterns to apply for the signature-based application identification.

4. The network security device of claim 1, further comprising:
a flow analysis module configured to analyze packet headers of packets in the packet flow to identify the layer four ports for a transport layer protocol associated with the packet flow; and
a flow table, wherein the flow analysis module and the rules engine are further configured to modify the flow table to store the identified layer seven application associated with the packet flow and the layer four ports for the transport layer protocol associated with the packet flow.

5. The network security device of claim 1, further comprising a management module that presents a user interface to receive configuration information that defines the security policy.

6. The network security device of claim 1, wherein the match criteria further includes a network source, and further comprising:
a query module configured to identify a network source associated with a received packet flow by querying a domain controller with a source Internet Protocol (IP) address associated with the packet flow to obtain one of a user or a user role associated with the source IP address,
wherein the rules engine applies the actions of the security policy to the packet flow by applying the actions of the security policy to the packet flow upon determining the user or user role associated with the source IP address matches the network source defined by the security policy.

7. The network security device of claim 1, wherein the match criteria of the security policy further includes a network destination, wherein the network destination is defined as one or more Internet Protocol (IP) addresses and an output zone that defines one or more output interfaces of the network security device.

8. The network security device of claim 1, wherein the match criteria of the security policy further includes a network source defined by the security policy in terms of one of a user and a user role.

9. The network security device of claim 1, wherein the match criteria of the security policy further includes a network destination, wherein the network destination is defined as one or more Internet Protocol (IP) addresses and an output zone that defines one or more output interfaces of the network security device.

10. The network security device of claim 1, wherein the security policy defines the one or more layer four ports for the transport-layer protocol as a range of layer four ports.

11. The network security device of claim 1, wherein the rules engine dynamically creates a new security policy that includes:
   (a) match criteria that include a layer four port for the transport-layer protocol that is not one of the one or more layer four ports of the static port list of the match criteria of the security policy and that also include the type of layer seven application, and
   (b) actions to be applied to packet flows that match the match criteria, wherein the actions allow access to the network by a matching packet flow within a defined time period on a different layer four port than any of the one or more layer four ports of the static port list of the match criteria of the security policy,
   wherein the rules engine is further configured to, upon determining that the packet flow matches the layer four port of the new security policy, apply the actions of the new security policy to the packet flow.

12. The network security device of claim 1, wherein the actions to be applied include logging one or more of: whether a matching packet flow was allowed or denied, the identity of the user that was allowed or denied, the type of layer seven application associated with the packet flow, a layer four port associated with the packet flow, and a timestamp indicating when a matching packet flow was detected.

13. A method comprising:
   by a network security device configured to control access to a network, receiving a security policy that includes:
      (a) match criteria that include a static port list of one or more layer four ports for a transport-layer protocol and a type of layer seven application, and
      (b) actions to be applied to packet flows that match the match criteria;
   by the network security device, receiving a packet flow;
   by the network security device, dynamically identifying a type of layer seven application associated with the packet flow by inspecting application-layer data within payloads of packets of the packet flow and without basing the identification solely on a layer four port specified by headers within the packets;
   by the network security device, determining whether the dynamically identified type of layer seven application associated with the packet flow matches the type of layer seven application of the security policy;
   by the network security device, applying the security policy to determine whether the packet flow matches a layer four port in the static port list of the match criteria of the security policy; and
   by the network security device and upon determining that the packet flow matches a layer four port of the static port list and upon determining the dynamically identified type of layer seven application associated with the packet flow matches the type of layer seven application of the security policy, applying the actions of the security policy to the packet flow.

14. The method of claim 13, wherein dynamically identifying the type of layer seven application associated with the received packet flow by inspecting application-layer data comprises performing deep packet inspection and signature-based application identification to dynamically identify the type of layer seven application.

15. The method of claim 13, further comprising:
   analyzing, by the network security device, packet headers of packets in the packet flow to identify the layer four ports for a transport layer protocol associated with the packet flow; and
   modifying, by the network security device, a flow table to store the identified layer seven application and layer four ports associated with the packet flow.

16. The method of claim 13, wherein the match criteria of the security policy further includes a network destination, wherein the network destination is defined as one or more Internet Protocol (IP) addresses and an output zone that defines one or more output interfaces of the network security device.

17. The method of claim 13, wherein the match criteria of the security policy further includes a network source defined by the security policy in terms of one of a user and a user role, the method further comprising:
   identifying a network source associated with a received packet flow by querying a domain controller with a source Internet Protocol (IP) address associated with the packet flow to obtain one of a user or a user role associated with the source IP address,
   wherein applying the actions of the security policy to the packet flow further comprises applying the actions of the security policy to the packet flow upon determining the user or user role associated with the source IP address matches the network source defined by the security policy.

18. The method of claim 13, further comprising:
   dynamically creating, by the network security device, a new security policy that includes:
      (a) match criteria that include a layer four port for the transport-layer protocol that is not one of the one or more layer four ports of the static port list of the match criteria of the security policy and that also include the type of layer seven application, and
      (b) actions to be applied to packet flows that match the match criteria, wherein the actions allow access to the network by a matching packet flow within a defined time period on a different layer four port than any of the one or more layer four ports of the static port list of the match criteria of the security policy; and
   by the network security device and upon determining that the packet flow matches the layer four port of the new security policy, applying the actions of the new security policy to the packet flow.

19. The method of claim 13, wherein the actions to be applied include logging one or more of: whether a matching packet flow was allowed or denied, the identity of the user that was allowed or denied, the type of layer seven application associated with the packet flow, a layer four port associated with the packet flow, and a timestamp indicating when a matching packet flow was detected.

20. A non-transitory computer-readable storage medium comprising instructions for causing one or more programmable processors to:
- by a network security device configured to control access to a network, receive a security policy that includes:
  - (a) match criteria that include a static port list of one or more layer four ports for a transport-layer protocol and a type of layer seven application, and
  - (b) actions to be applied to packet flows that match the match criteria;
- by the network security device, receive a packet flow;
- by the network security device, dynamically identify a type of layer seven application associated with the packet flow by inspecting application-layer data within payloads of packets of the packet flow and without basing the identification solely on a layer four port specified by headers within the packets;
- by the network security device, determine whether the dynamically identified type of layer seven application associated with the packet flow matches the type of layer seven application of the security policy;
- by the network security device, apply the security policy to determine whether the packet flow matches a layer four port in the static port list of the match criteria of the security policy; and
- by the network security device and upon determining that the packet flow matches a layer four port of the static port list and upon determining the dynamically identified type of layer seven application associated with the packet flow matches the type of layer seven application of the security policy, apply the actions of the security policy to the packet flow.

* * * * *